US010797529B2

(12) United States Patent
Suga et al.

(10) Patent No.: US 10,797,529 B2
(45) Date of Patent: Oct. 6, 2020

(54) WIRELESS POWER TRANSFER APPARATUS AND WIRELESS POWER TRANSFER SYSTEM

(71) Applicants: Mitsubishi Electric Corporation, Tokyo (JP); Mitsubishi Electric Home Appliance Co., Ltd., Fukaya-shi, Saitama (JP)

(72) Inventors: Ikuro Suga, Tokyo (JP); Jun Bunya, Tokyo (JP); Ryota Asakura, Tokyo (JP)

(73) Assignees: Mistubishi Electric Corporation, Tokyo (JP); Mitsubishi Electric Home Application Co., Ltd., Fukaya-shi, Saitama (JP)

(*) Notice: Subject to any disclaimer, the term of this patent is extended or adjusted under 35 U.S.C. 154(b) by 0 days.

(21) Appl. No.: 16/330,539

(22) PCT Filed: Oct. 13, 2016

(86) PCT No.: PCT/JP2016/080295
§ 371 (c)(1),
(2) Date: Mar. 5, 2019

(87) PCT Pub. No.: WO2018/070003
PCT Pub. Date: Apr. 19, 2018

(65) Prior Publication Data
US 2020/0021136 A1     Jan. 16, 2020

(51) Int. Cl.
*H02J 50/12* (2016.01)
*H02J 50/80* (2016.01)
(Continued)

(52) U.S. Cl.
CPC .......... *H02J 50/12* (2016.02); *H01F 27/2885* (2013.01); *H01F 27/29* (2013.01); *H02J 50/80* (2016.02)

(58) Field of Classification Search
CPC ................. H02J 50/10; H02J 50/12
(Continued)

(56) References Cited

U.S. PATENT DOCUMENTS 8,912,686 B2 * 12/2014 Stoner, Jr. ............... H02J 5/005
                                                              307/104
9,161,484 B2 * 10/2015 Baarman ................. H05K 9/002
(Continued)

FOREIGN PATENT DOCUMENTS

EP      3 255 958 A1    12/2017
EP      3336437 A1      6/2018
(Continued)

OTHER PUBLICATIONS

Extended European Search Report dated Sep. 9, 2019 issued in corresponding EP patent application No. 16918585.7.
(Continued)

*Primary Examiner* — Hai L Nguyen
(74) *Attorney, Agent, or Firm* — Posz Law Group, PLC

(57) ABSTRACT

A wireless power transfer apparatus according to the present invention is a wireless power transfer apparatus for transferring power to a power receiving apparatus. The wireless power transfer apparatus includes a support on which the power receiving apparatus is placed, a coil disposed below the support, the coil generating a high-frequency magnetic field upon receiving supply of a high-frequency current, a communication device disposed below the support to perform radio communication with the power receiving apparatus, a first magnetic shield member made of an electric conductor, the first magnetic shield member being disposed between the communication device and the coil, and a second magnetic shield member made of an electric conductor or a magnetic body, the second magnetic shield (Continued)

member being disposed on at least one of a lower surface and a lateral surface of the communication device.

20 Claims, 9 Drawing Sheets

(51) Int. Cl.
*H01F 27/28* (2006.01)
*H01F 27/29* (2006.01)

(58) Field of Classification Search
USPC .......................................................... 307/104
See application file for complete search history.

(56) References Cited

U.S. PATENT DOCUMENTS

| | | | |
|---|---|---|---|
| 10,658,869 B2 * | 5/2020 | Muratov | ................. H02J 50/10 |
| 2014/0158680 A1 | 6/2014 | Kitaizumi et al. | |
| 2017/0353054 A1 | 12/2017 | Lee | |

FOREIGN PATENT DOCUMENTS

| | | |
|---|---|---|
| JP | 2005-078949 A | 3/2005 |
| JP | 2013-132171 A | 7/2013 |
| JP | 2014-146532 A | 8/2014 |
| JP | 2014-202407 A | 10/2014 |
| JP | 2015-047389 A | 3/2015 |
| JP | 2016-092214 A | 5/2016 |
| KR | 10-1589701 | 1/2016 |
| WO | 2013/094174 A1 | 6/2013 |
| WO | 2016/080594 A1 | 5/2016 |
| WO | 2016/125227 A1 | 8/2016 |

OTHER PUBLICATIONS

International Search Report of the International Searching Authority dated Dec. 27, 2016 for the corresponding International application No. PCT/JP2016/080295 (and English translation).

* cited by examiner

WIRELESS POWER TRANSFER APPARATUS AND WIRELESS POWER TRANSFER SYSTEM

CROSS REFERENCE TO RELATED APPLICATION

This application is a U.S. national stage application of PCT/JP2016/080295 filed on Oct. 13, 2016, the contents of which are incorporated herein by reference.

TECHNICAL FIELD

The present invention relates to a wireless power transfer apparatus for transferring power to a power receiving apparatus, and a wireless power transfer system.

BACKGROUND ART

Some proposed wireless power transfer apparatuses according to related art include a heating-side transmitting and receiving unit (power-transmitting-side transmitting and receiving unit) to transmit and receive a predetermined signal. Such a wireless power transfer apparatus performs radio communication with the power-receiving-side transmitting and receiving unit of a wireless power receiving apparatus (see, for example, Patent Literature 1).

CITATION LIST

Patent Literature

Patent Literature 1: International Publication No. 2013/094174

SUMMARY OF INVENTION

Technical Problem

In a wireless power transfer apparatus described in Patent Literature 1, a power-transmitting-side transmitting and receiving unit and a power-receiving-side transmitting and receiving unit are disposed to face each other if a top plate were not provided. In this configuration, a top plate intervenes between the power-transmitting-side transmitting and receiving unit and the power-receiving-side transmitting and receiving unit. The power-transmitting-side transmitting and receiving unit is disposed in the surroundings of a heating coil (primary coil) that feeds power to a power receiving coil.

A problem with the above-mentioned wireless power transfer apparatus, however, is that a high-frequency magnetic field is generated from the primary coil of the wireless power transfer apparatus, and such a high-frequency magnetic field tends to cause interference with radio communication between the between the power-transmitting-side transmitting and receiving unit and the power-receiving-side transmitting and receiving unit.

The present invention has been made to address the above-mentioned problem, and accordingly, it is an object of the present invention to provide a wireless power transfer apparatus capable of reducing interference with radio communication between a power receiving apparatus and the wireless power transfer apparatus, and a wireless power transfer system.

Solution to Problem

A wireless power transfer apparatus according to an embodiment of the present invention is a wireless power transfer apparatus for transferring power to a power receiving apparatus, the wireless power transfer apparatus comprising: a support on which the power receiving apparatus is placed; a coil disposed below the support and configured to generate a high-frequency magnetic field upon receiving supply of a high-frequency current; a communication device disposed below the support and configured to perform radio communication with the power receiving apparatus; a first magnetic shield member made of an electric conductor, the first magnetic shield member being disposed between the communication device and the coil; and a second magnetic shield member made of an electric conductor or a magnetic body, the second magnetic shield member being disposed on at least one of a lower surface and a lateral surface of the communication device.

Advantageous Effects of Invention

The wireless power transfer apparatus according to an embodiment of the present invention includes the first magnetic shield member disposed between the communication device and the coil, and the second magnetic shield member disposed on at least one of the lower surface and the lateral surface of the communication device. This configuration makes it possible to reduce interference with the radio communication between the power receiving apparatus and the communication device.

DESCRIPTION OF EMBODIMENTS

Embodiment 1

(Configuration)

Figure 1:
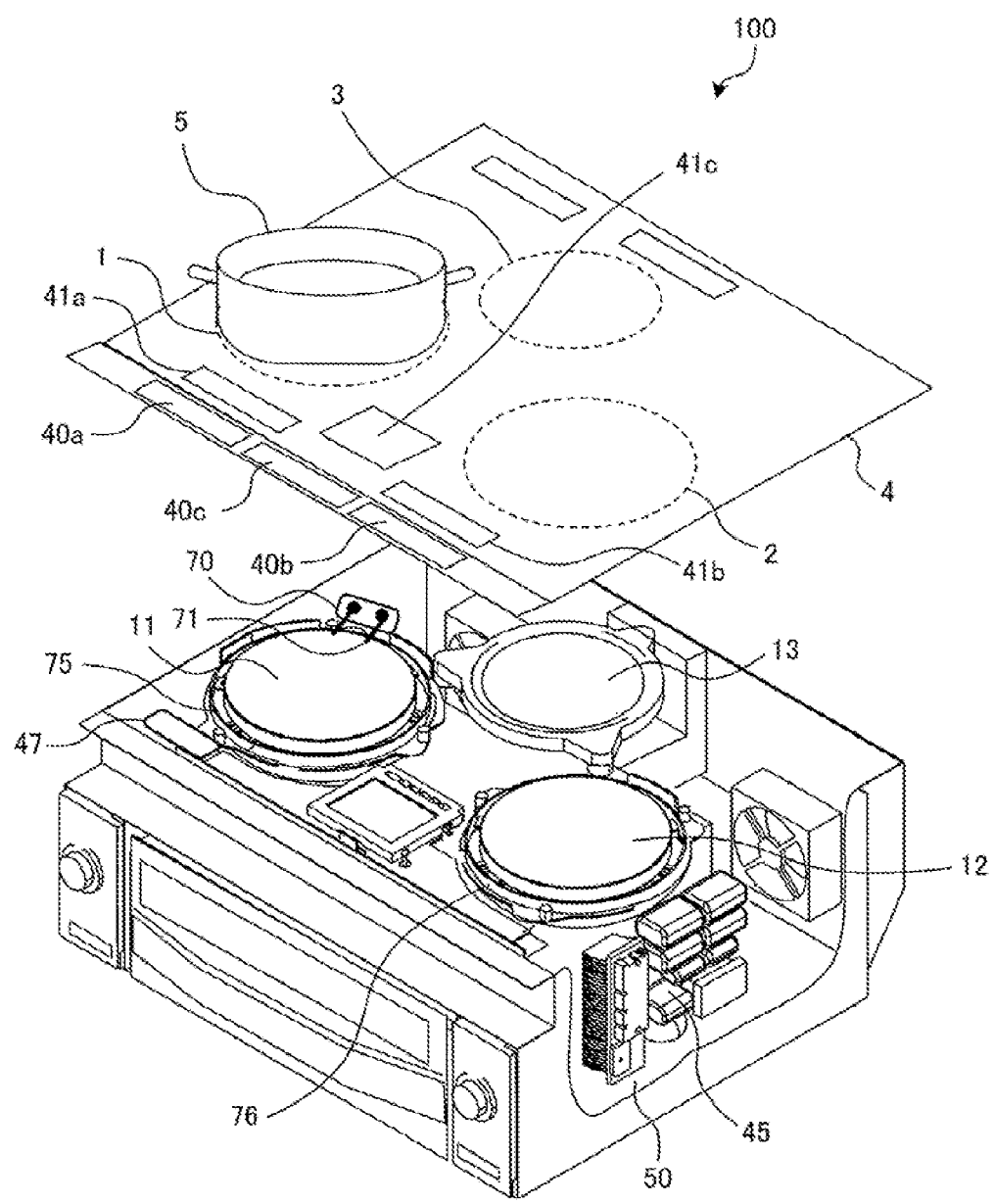
FIG. 1 is an exploded perspective view of an induction heating cooker according to Embodiment 1 of the present invention.

FIG. 1 is an exploded perspective view of an induction heating cooker according to Embodiment 1 of the present invention.

As illustrated in FIG. 1, an induction heating cooker 100 has, at its top, a top plate 4 on which a heating target object 5 such as a pot is placed. As will be described later with reference to FIG. 3 or other figures, a power receiving apparatus 200 is also placed on the top plate 4 of the induction heating cooker 100 according to Embodiment 1. The induction heating cooker 100 according to Embodiment 1 functions as a wireless power apparatus that transfers power to the power receiving apparatus 200.

The top plate 4 includes a first induction heating zone 1 and a second induction heating zone 2 as heating zones for inductively heating the heating target object 5. The first induction heating zone 1 and the second induction heating zone 2 are arranged side by side in the lateral direction, at a location near the front edge of the top plate 4. The induction heating cooker 100 according to Embodiment 1 also includes a third induction heating zone 3 as the third heating zone. The third induction heating zone 3 is located behind the first induction heating zone 1 and the second induction heating zone 2, substantially at the center in the lateral direction of the top plate 4.

A first induction heating coil 11, a second induction heating coil 12, and a third induction heating coil 13 are respectively disposed under the first induction heating zone 1, the second induction heating zone 2, and the third induction heating zone 3. Each of the first to third induction heating coils 11 to 13 heats a heating target object placed on the corresponding heating zone.

High-frequency power is supplied to the first induction heating coil 11, the second induction heating coil 12, and the third induction heating coil 13 from a driving circuit 50. As high-frequency power is supplied from the driving circuit 50, the first induction heating coil 11, the second induction heating coil 12, and the third induction heating coil 13 each generate a high-frequency magnetic field. In the following description, the first induction heating coil 11, the second induction heating coil 12, and the third induction heating coil 13 will be also referred to without distinction as "induction heating coil".

A wiring 71 of the first induction heating coil 11 is connected to the wiring of the driving circuit 50 via a terminal block 70. Although not illustrated, there are provided a terminal block that connects the wiring of the second induction heating coil 12 with the wiring of the driving circuit 50, and a terminal block that connects the wiring of the third induction heating coil 13 with the wiring of the driving circuit 50. A detailed configuration of the driving circuit 50 will be described later.

A magnetic shield ring 75 formed in an annular shape is disposed around the outer periphery of the first induction heating coil 11. A magnetic shield ring 76 formed in an annular shape is disposed around the outer periphery of the second induction heating coil 12. Although not illustrated, a magnetic shield ring formed in an annular shape is disposed around the outer periphery of the third induction heating coil 13.

The entirety of the top plate 4 is made of a material that transmits infrared radiation, such as heat-resistant tampered glass or crystallized glass. Round-shaped pot-position indicators, which roughly indicate where to place a pot, are formed on the top plate 4 by paint coating, printing, or other methods at positions corresponding to the respective heating areas (heating zones) of the first induction heating coil 11, the second induction heating coil 12, and the third induction heating coil 13.

The operating unit 40 is located near the front edge of the top plate 4. The operating unit 40 serves as an input device for making settings such as how much heating power (electric power) is to be input in heating the heating target object 5 or other objects by use of the first induction heating coil 11, the second induction heating coil 12, and the third induction heating coil 13, and cooking menu (e.g., water boiling mode or fryer mode) settings. In Embodiment 1, the operating unit 40 is split for each individual induction heating coil, into an operating unit 40a, an operating unit 40b, and an operating unit 40c.

A display unit 41 is disposed as an informing unit near the operating unit 40. The display unit 41 displays information such as the operating state of each corresponding induction heating coil, and descriptions of inputs and operations made from the operating unit 40. In Embodiment 1, the display unit 41 is split for each individual induction heating coil, into a display unit 41a, a display unit 41b, and a display unit 41c.

There is no particular limitation on the manner in which the operating unit 40 and the display unit 41 are provided. For example, the operating unit 40 and the display unit 41 may be provided for each individual induction heating coil as described above, or may be common to all induction heating coils. Examples of the operating unit 40 include mechanical switches, such as push switches and tactile switches, and touch switches or other such switches that detect an input operation based on a change in electrode capacitance. Examples of the display unit 41 include a liquid crystal device (LCD) and an LED.

The operating unit 40 and the display unit 41 may be integrated into an operating/display unit 43. The operating/display unit 43 is implemented as, for example, a touch panel with a touch switch arranged on the upper surface of an LCD.

The first induction heating coil 11, the second induction heating coil 12, and the third induction heating coil 13 are configured as described below, for example. It is to be noted that the first induction heating coil 11, the second induction heating coil 12, and the third induction heating coil 13 are identical or similar in configuration. Accordingly, the first induction heating coil 11 will be described below as a representative example.

Figure 2:
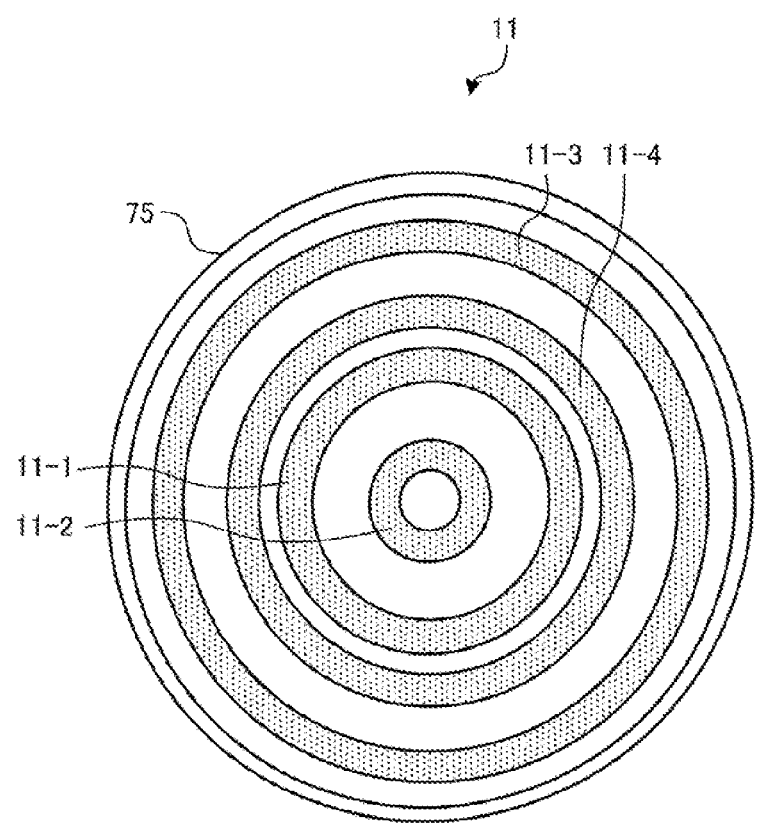
FIG. 2 is a plan view of an induction heating coil of the induction heating cooker according to Embodiment 1 of the present invention.

FIG. 2 is a plan view of an induction heating coil of the induction heating cooker according to Embodiment 1 of the present invention.

The first induction heating coil 11 is made up of a plurality of coils arranged in a substantially concentric manner. For example, the first induction heating coil 11 is made up of four layers of coils 11-1 to 11-4 arranged in a substantially concentric manner. The coils 11-1 to 11-4 are connected into a single continuous coil. The coils 11-1 to 11-4 are each formed as a winding of an electrically conductive wire made of any given insulated metal (e.g., copper or aluminium).

Although FIG. 2 illustrates a case in which the first induction heating coil 11 is made up of the four layers of coils 11-1 to 11-4, the first induction heating coil 11 may be made up of at least several coil segments wound in a substantially concentric manner.

The magnetic shield ring 75 is formed in an annular shape and spaced apart from the first induction heating coil 11 such that the magnetic shield ring 75 surrounds the outer periphery of the first induction heating coil 11. The magnetic shield ring 75 is made of an electric conductor. The magnetic shield ring 75 surrounds the outer periphery of the first induction heating coil 11 so that, upon passage of high-frequency current through the first induction heating coil 11, a high-frequency magnetic field not reaching the heating target object 5 placed above the first induction heating coil 11 does not easily leak out of the first induction heating coil 11.

For example, the magnetic shield ring 75 is formed by bending, into a circular shape, a metal member that is elongated in one direction, and pressure-welding or welding the ends of the metal member by crimping or other methods to make a joint, thus ensuring electrical continuity. Accordingly, when the first induction heating coil 11 generates a high-frequency magnetic field, an eddy current also flows in the magnetic shield ring 75. This eddy current is converted into heat due to the internal resistance of the magnetic shield ring 75, thus reducing leakage magnetic flux. The material of the magnetic shield ring 75 is, for example, aluminum or copper. The width of the magnetic shield ring 75 with respect to the vertical direction is, for example, substantially equal to the width of the first induction heating coil 11. It is needless to mention that the above-mentioned width may be greater than the coil width.

Referring to FIG. 1 again, a control unit 45 is accommodated in the induction heating cooker 100 to control the overall operation of the induction heating cooker 100 including the driving circuit 50.

Figure 3:
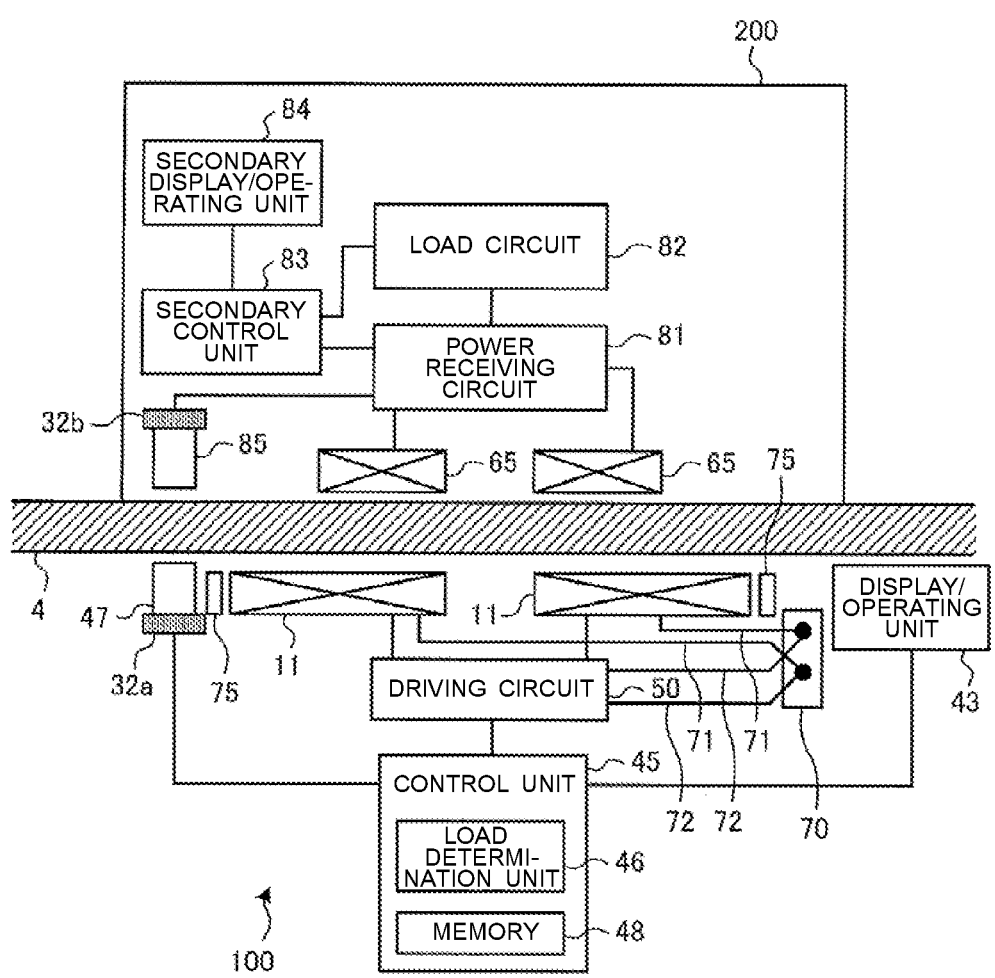
FIG. 3 is a block diagram illustrating the configuration of the induction heating cooker (wireless power feeding apparatus) according to Embodiment 1 of the present invention, and the configuration of a power receiving apparatus placed on the top plate of the induction heating cooker.

The control unit 45 is implemented by dedicated hardware, or a central processing unit (CPU; also referred to as processing unit, arithmetic unit, microprocessor, microcomputer, or processor) that executes a program stored in a memory 48 (see FIG. 3).

If the control unit 45 is dedicated hardware, the control unit 45 corresponds to, for example, a single circuit, a composite circuit, an application specific integrated circuit (ASIC), a field-programmable gate array (FPGA), or a combination thereof. Each individual functional unit to be implemented by the control unit 45 may be implemented by an individual piece of hardware, or each functional unit may be implemented by a single piece of hardware.

If the control unit 45 is a CPU, each function executed by the control unit 45 is implemented by software, firmware, or a combination of software and firmware. The software or firmware, which is written as a program, is stored in the memory 48. As the CPU loads and executes the program stored in the memory 48, each function of the control unit 45 is implemented. The memory 48 is, for example, a non-volatile or volatile semiconductor memory, such as a RAM, a ROM, a flash memory, an EPROM, or an EEPROM.

Some functions of the control unit 45 may be implemented by dedicated hardware, and some functions may be implemented by software or firmware.

A primary-side communication device 47, which performs radio communication with the power receiving apparatus 200 placed on the top plate 4, is disposed below the top plate 4. The primary-side communication device 47 is implemented by, for example, a radio communication interface compliant with a given communication standard, such as near field communication (NFC: short-range radio communication), Wi-Fi (registered trademark), or Bluetooth (registered trademark). For example, the primary-side communication device 47 is implemented by an NFC tag compliant with the NFC standard.

FIG. 3 is a block diagram illustrating the configuration of the induction heating cooker (wireless power feeding apparatus) according to Embodiment 1 of the present invention, and the configuration of the power receiving apparatus placed on the top plate of the induction heating cooker. FIG. 3 depicts the power receiving apparatus 200 when placed on the first induction heating zone 1 on the top plate 4 of the induction heating cooker 100. The induction heating cooker 100, which functions as a wireless power transfer apparatus, and the power receiving apparatus 200 constitute a wireless power transfer system.

As illustrated in FIG. 3, the primary-side communication device 47 of the induction heating cooker 100 is disposed below the top plate 4, at a position outside the outer periphery of each of the first induction heating coil 11 and the magnetic shield ring 75. That is, the magnetic shield ring 75 is disposed between the primary-side communication device 47 and the first induction heating coil 11.

The primary-side communication device 47 is disposed at a position such that the primary-side communication device 47 does not overlap the terminal block 70, which connects the wiring 71 of the first induction heating coil 11 with a wiring 72 of the driving circuit 50, as viewed in the vertical direction. A high-frequency current supplied from the driving circuit 50 to the first induction heating coil 11 passes through the terminal block 70. This generates a high-frequency magnetic field around the terminal block 70. Such a high-frequency magnetic field acts as a source of noise for radio communication. If the primary-side communication device 47 is placed at a position not overlapping the terminal block 70 as viewed in the vertical direction as described above, this reduces the possibility of the high-frequency magnetic field from the terminal block 70 reaching the primary-side communication device 47, thus making it possible to reduce the influence of noise.

A magnetic shield plate 32a made of an electric conductor or a magnetic body is disposed on the lower surface of the primary-side communication device 47. The magnetic shield plate 32a is disposed on a surface of the primary-side communication device 47 that does not face the power receiving apparatus 200. The magnetic shield plate 32a is formed to have, for example, a plate-like shape, and disposed in contact with the lower surface of the primary-side communication device 47. Desirably, in plan view as seen from the power receiving apparatus 200, the magnetic shield plate 32a is larger in area than the primary-side communication device 47. The magnetic shield plate 32a may not necessarily have the above-mentioned size but may have any size as long as the magnetic shield plate 32a is disposed at least on a portion of the lower surface of the primary-side communication device 47.

The magnetic shield plate 32a is made of, for example, ferrite, which is a magnetic body. Placing the magnetic shield plate 32a made of a magnetic body facilitates the linkage of a high-frequency magnetic field generated from the first induction heating coil 11 with the magnetic shield plate 32a, resulting in less magnetic field reaching the primary-side communication device 47.

The magnetic shield plate 32a is made of, for example, a material, which is an electric conductor, such as aluminum or copper. Placing the magnetic shield plate 32a made of an electric conductor has the following effect. When a high-frequency magnetic field generated from the first induction heating coil 11 reaches the magnetic shield plate 32a, an eddy current flows in the magnetic shield plate 32a, and this eddy current is converted into heat due to the internal resistance of the magnetic shield plate 32a. This results in less high-frequency magnetic field reaching the primary-side communication device 47.

The power receiving apparatus 200 is, for example, a cooking appliance (e.g., a fryer, a steamer, a roster, or a toaster) used for cooking food. Alternatively, for example, the power receiving apparatus 200 is a cooking appliance (e.g., a blender, a mixer, a mill, a whisk, or a food processor) used for pre-cooking preparations, pre-cooking processing, or other purposes.

The power receiving apparatus 200 includes a power receiving coil 65 that receives power by means of electromagnetic induction, a power receiving circuit 81 that rectifies and smoothes power received by the power receiving coil 65, a load circuit 82 connected to the output side of the power receiving circuit 81, and a secondary control unit 83 that controls the power receiving circuit 81 and the load circuit 82.

The power receiving apparatus 200 is placed on the top plate 4 of the induction heating cooker 100 to wirelessly receive power from the induction heating cooker 100. That is, when high-frequency power is supplied by the driving circuit 50 to the first induction heating coil 11 placed under the top plate 4 of the induction heating cooker 100, a high-frequency magnetic field is generated from the first induction heating coil 11. The high-frequency magnetic field is received by the power receiving coil 65 disposed inside the power receiving apparatus 200. Power is thus wirelessly supplied to the power receiving apparatus 200.

At this time, if the a heater serves as the load circuit 82, the secondary control unit 83 of the power receiving apparatus 200 controls the power receiving circuit 81 such that power received by the power receiving coil 65 is supplied to the load circuit 82 directly as alternating-current power without conversion.

If, for example, a motor serves as the load circuit 82, the secondary control unit 83 controls the power receiving circuit 81 such that power received by the power receiving coil 65 is rectified and smoothed, and converted into given alternating-current power by an inverter circuit or other components before being supplied to the load circuit 82. In other words, if a motor serves as the load circuit 82, the load circuit 82 is driven at variable speed. In another example, direct current may be applied to a heater load by rectifying and smoothing received electric current generated by power. It is needless to mention that a motor load may be driven at constant speed.

It is preferable to also provide the power receiving apparatus 200 with an operating unit and a display unit. The operating unit may be used to perform, for example, operations such as starting and stopping supply of power to the power receiving apparatus 200. The display unit displays, for example, information such as the power reception state of the power receiving apparatus 200. In Embodiment 1, the operating unit and the display unit are integrated into a secondary display/operating unit 84.

The power receiving apparatus 200 includes a secondary-side communication device 85. The secondary-side communication device 85 is disposed at a position such that, when the power receiving apparatus 200 is placed on the top plate 4, and the power receiving coil 65 and the first induction heating coil 11 become facing each other, the secondary-side communication device 85 would face the primary-side communication device 47 if the top plate 4 were not provided. In this configuration, the top plate 4 intervenes between the secondary-side communication device 85 and the power receiving coil 65.

The secondary-side communication device 85 is implemented by a radio communication interface compliant with the communication standard of the primary-side communication device 47. The secondary-side communication device 85 performs radio communication with the primary-side communication device 47 of the induction heating cooker 100. For example, the secondary-side communication device 85 is implemented by an NFC reader compliant with the NFC standard. With the primary-side communication device 47 being implemented by an NFC tag, and the secondary-side communication device 85 being implemented by an NFC reader, bidirectional communication can be achieved in an inexpensive manner.

A magnetic shield plate 32b made of an electric conductor or a magnetic body is disposed on the upper surface of the secondary-side communication device 85. The magnetic shield plate 32b is disposed on a surface of the secondary-side communication device 85 that does not face the induction heating cooker 100. The magnetic shield plate 32b is formed in, for example, a plate-like shape, and disposed in contact with the upper surface of the secondary-side communication device 85. Desirably, in plan view as seen from the induction heating cooker 100, the magnetic shield plate 32b is larger in area than the secondary-side communication device 85. The magnetic shield plate 32b may not necessarily have the above-mentioned size but may have any size as long as the magnetic shield plate 32b is disposed at least on a portion of the upper surface of the secondary-side communication device 85.

The magnetic shield plate 32b may be made of, for example, ferrite, which is a magnetic body. Placing the magnetic shield plate 32b made of a magnetic body facilitates the linkage of a high-frequency magnetic field generated from the first induction heating coil 11 with the magnetic shield plate 32b, resulting in less magnetic field reaching the secondary-side communication device 85.

The magnetic shield plate 32b is made of, for example, a material such as aluminum or copper, which is an electric conductor. Placing the magnetic shield plate 32b made of an electric conductor has the following effect. When a high-frequency magnetic field generated from the first induction heating coil 11 reaches the magnetic shield plate 32b, an eddy current flows in the magnetic shield plate 32b, and this eddy current is converted into heat due to the internal resistance of the magnetic shield plate 32b. This results in less high-frequency magnetic field reaching the secondary-side communication device 85.

The primary-side communication device 47 and the secondary-side communication device 85 are each disposed at a position such that the strength of the high-frequency magnetic field generated from the first induction heating coil 11 is less than the radio field strength of the radio communication between the primary-side communication device 47 and the secondary-side communication device 85. In other words, the primary-side communication device 47 and the secondary-side communication device 85 are each disposed at a position such that the level of communication noise due to the high-frequency magnetic field generated from the first induction heating coil 11 is below the output level at the communication frequency of the radio communication between the primary-side communication device 47 and the secondary-side communication device 85.

For example, the primary-side communication device 47 and the secondary-side communication device 85 are each disposed at a position such that the strength of the high-frequency magnetic field generated from the first induction heating coil 11 when the high-frequency current supplied to the first induction heating coil 11 is at its maximum value is less than the radio field strength at the frequency of communication between the primary-side communication device 47 and the secondary-side communication device 85.

Although not illustrated in FIG. 3, the power receiving coil 65 is identical or similar in configuration to, for example, the first induction heating coil 11.

Although not illustrated in FIG. 3, a ferrite is disposed under the first induction heating coil 11 as a magnetic body. The ferrite has, for example, a flat shape. The upper surface of the flat-shaped ferrite may be provided with protrusions that are inserted between the coils constituting the first induction heating coil 11, with the longitudinal section of the ferrite being in a convex shape, an F-shape, an E-shape, or other shapes. Further, although not illustrated in FIG. 3, a ferrite is disposed over the power receiving coil 65 as a magnetic body. The ferrite has, for example, a flat shape. The lower surface of the flat-shaped ferrite may be provided with protrusions that are inserted between the coils constituting the power receiving coil 65, with the longitudinal section of the ferrite being in a convex shape, an F-shape, an E-shape, or other shapes.

Figure 4:
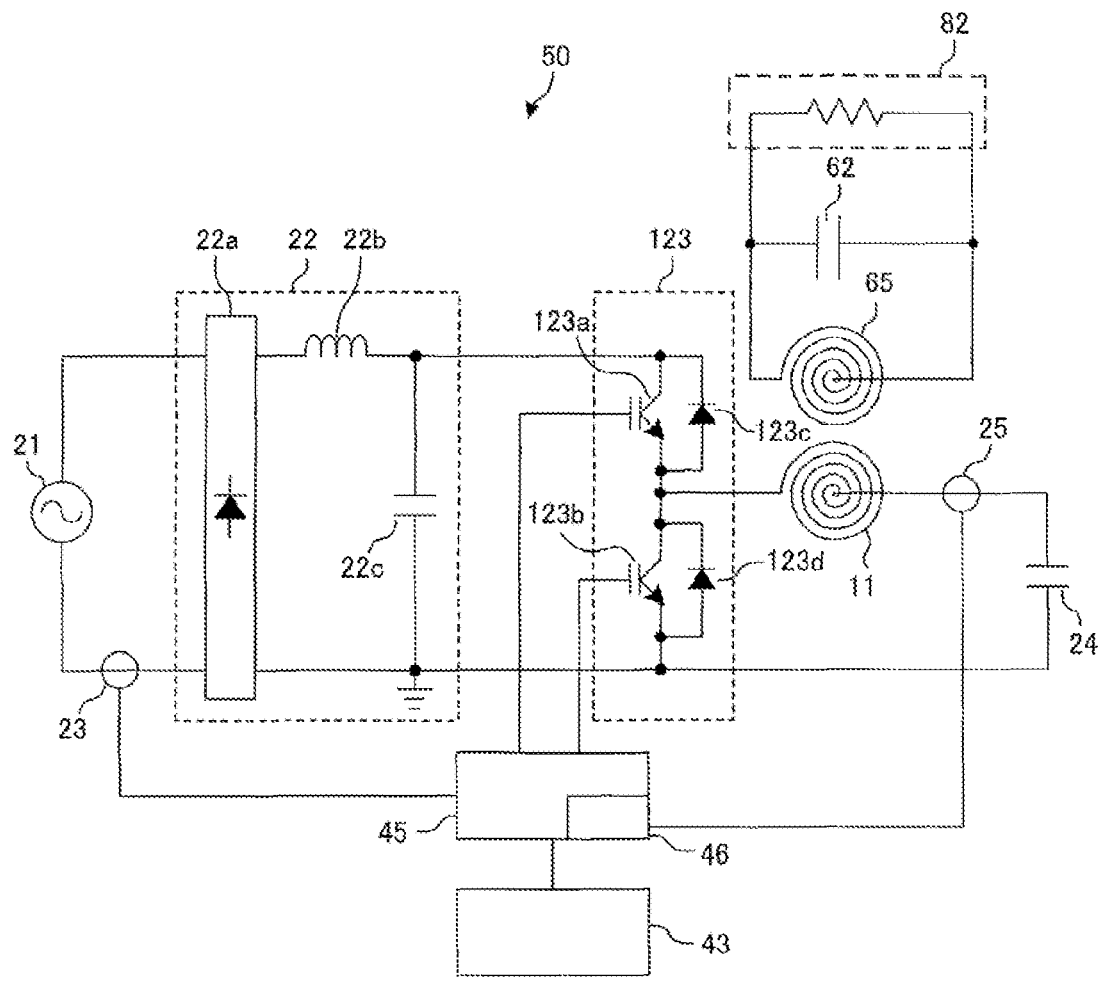
FIG. 4 is a circuit configuration diagram illustrating a driving circuit of the induction heating cooker according to Embodiment 1 of the present invention, and the power receiving apparatus.

FIG. 4 is a circuit configuration diagram illustrating the driving circuit of the induction heating cooker according to Embodiment 1 of the present invention, and the power receiving apparatus. FIG. 4 illustrates the circuit configuration of each of the driving circuit 50, the control unit 45, and a load determination unit inside the control unit 45, which are connected to the first induction heating coil 11, and the circuit configuration of the power receiving apparatus 200. The driving circuit, the control unit, and the load determination unit that are connected to each of the second induction heating coil 12 and the third induction heating coil 13 are also same as in configuration or similar in configuration to the driving circuit 50 and the control unit 45 illustrated in FIG. 4.

The driving circuit 50 is a half-bridge driving circuit. The driving circuit 50 includes a direct-current power supply circuit 22, an inverter circuit 123, and a power-transmitting-side resonant capacitor 24.

An input-current detecting unit 23 is implemented by, for example, a current sensor. The input-current detecting unit 23 detects a current input from an alternating-current power supply (commercial power supply) 21 to the direct-current power supply circuit 22, and outputs, to the control unit 45, a voltage signal corresponding to the value of the input current.

The direct-current power supply circuit 22 includes a diode bridge 22a, a reactor 22b, and a smoothing capacitor 22c. The direct-current power supply circuit 22 converts an alternating-current voltage input from the alternating-current power supply 21 into a direct-current voltage, and outputs the direct-current voltage to the inverter circuit 123.

The inverter circuit 123 is an inverter in which IGBTs 123a and 123b serving as switching elements are connected in series with the output side of the direct-current power supply circuit 22. In the inverter circuit 123, diodes 123c and 123d serving as flywheel diodes are respectively connected in parallel with the IGBTs 123a and 123b. The IGBT 123a and the IGBT 123b are each driven on and off by a drive signal output from the control unit 45. The control unit 45 outputs a drive signal for alternately switching the IGBT 123a and the IGBT 123b on and off, such that the IGBT 123b is switched off while the IGBT 123a is in on-state, and the IGBT 123b is switched on while the IGBT 123a is in off-state. As a result, the inverter circuit 123 converts direct-current power output from the direct-current power supply circuit 22 into alternating-current power at a specified frequency, and supplies the resulting power to a resonant circuit formed by the first induction heating coil 11 and the power-transmitting-side resonant capacitor 24. The alternating-current power at a specified frequency refers to, for example, alternating-current power at a high frequency of about 20 kHz to 100 kHz.

The power-transmitting-side resonant capacitor 24 is connected in series with the first induction heating coil 11. The resulting resonant circuit has a resonant frequency that varies with, for example, the inductance of the first induction heating coil 11 and the capacitance of the power-transmitting-side resonant capacitor 24.

With the driving circuit 50 configured as described above, a high-frequency current flows through the first induction heating coil 11. A high-frequency magnetic flux generated by the high-frequency current flowing through the first induction heating coil 11 enables power to be wirelessly transferred to the power receiving coil 65 of the power receiving apparatus 200 placed on the top plate 4 located directly above the first induction heating coil 11.

Although each of the IGBTs 123a and 123b serving as a switching element is formed by, for example, a semiconductor made of a silicon-based material, such a switching element may be formed by a wide-bandgap semiconductor made of a silicon carbide-based material, a gallium nitride-based material, or other materials. Using a wide-bandgap semiconductor as the switching element has the following advantages. That is, loss of the switching element can be reduced. Additionally, owing to the favorable heat radiation property of the driving circuit 50 even at higher (faster) switching frequencies (driving frequencies), the radiating fins of the driving circuit 50 can be downsized, thus enabling reduced size and cost of the driving circuit 50. Further, the switching element exhibits reduced switching loss even when driven at higher frequencies, thus enabling efficient wireless power supply.

A coil-current detecting unit 25 is connected to the resonant circuit formed by the first induction heating coil 11 and the power-transmitting-side resonant capacitor 24. The coil-current detecting unit 25 is implemented by, for example, a current sensor. The coil-current detecting unit 25 detects a coil current flowing through the first induction heating coil 11, and outputs, to the control unit 45, a voltage signal corresponding to the value of the coil current.

Although FIG. 4 depicts a half-bridge driving circuit, it is needless to mention that the driving circuit used may be a full-bridge driving circuit made up of four IGBTs and four diodes.

The power receiving apparatus 200 is provided with a power-receiving-side resonant capacitor 62 that forms a resonant circuit together with the power receiving coil 65.

The control unit 45 includes a load determination unit 46. The load determination unit 46 determines whether a load placed on the top plate 4 is the power receiving apparatus 200, based on whether the output-side impedance characteristics of the inverter circuit 123 exhibit a resonant characteristic as the driving frequency of the inverter circuit 123 is varied.

The first induction heating coil 11, the second induction heating coil 12, and the third induction heating coil 13 each correspond to "coil" according to the present invention.

The top plate 4 corresponds to "support" according to the present invention.

The control unit 45 corresponds to "controller" according to the present invention.

The "magnetic shield ring 75" corresponds to "first magnetic shield member" according to the present invention.

The "magnetic shield plate 32a" corresponds to "second magnetic shield member" according to the present invention.

The "magnetic shield plate 32b" corresponds to "third magnetic shield member" according to the present invention The "primary-side communication device 47" corresponds to "communication device" according to the present invention.

The "secondary-side communication device 85" corresponds to "second communication device" according to the present invention.

(Operation)

The following describes a heating operation and a power transfer operation performed by the induction heating cooker 100 according to Embodiment 1.

(Heating Operation)

The user places the heating target object 5 on a heating zone of the induction heating cooker 100, and performs, via the operating unit 40, an input operation that causes heating to begin.

If the load determination unit 46 determines that the load is the heating target object 5, the control unit 45 performs a heating operation that inductively heats the heating target object 5. That is, the control unit 45 performs a heating operation in which high-frequency power is supplied to the first induction heating coil 11 by controlling the driving circuit 50 to suitably generate the heating power to be applied in induction heating.

Consequently, the heating target object 5 placed on the top plate 4 is inductively heated.

(Power Transfer Operation)

The user places the power receiving apparatus 200 on a heating zone of the induction heating cooker 100, and performs, via the operating unit 40, an input operation that causes power transfer to begin.

The load determination unit 46 determines whether a load placed on the top plate 4 is the power receiving apparatus 200. If the load determination unit 46 determines that the load is the power receiving apparatus 200, the control unit 45 performs a power transfer operation that transfers power to the power receiving apparatus 200. That is, the control unit 45 controls the driving circuit 50 in accordance with the power to be transmitted to the power receiving coil 65, and supplies high-frequency power to the first induction heating coil 11.

Consequently, the high-frequency power supplied from the first induction heating coil 11 is received by the power receiving coil 65 disposed in the power receiving apparatus 200. The received power is supplied from the power receiving circuit 81 to the load circuit 82 to drive the load circuit 82.

The secondary-side communication device 85 of the power receiving apparatus 200 performs radio communication with the primary-side communication device 47 of the induction heating cooker 100. For example, the secondary-side communication device 85 transmits, to the induction heating cooker 100, information indicative of the type of the power receiving apparatus 200, information indicative of the specifications of the power receiving apparatus 200 such as rated power, and other information. The control unit 45 of the induction heating cooker 100 controls the driving circuit 50 in accordance with the information acquired from the power receiving apparatus 200 to thereby transfer power in a manner appropriate for the power receiving apparatus 200 being placed on the top plate 4.

Further, when the current through the power receiving coil 65 exceeds an upper limit value, the secondary control unit 83 of the power receiving apparatus 200 causes the secondary-side communication device 85 to transmit information requesting that receiving of power be stopped. Then, upon acquiring the information requesting that receiving of power be stopped, the control unit 45 of the induction heating cooker 100 causes the induction heating cooker 100 to stop the power transfer operation.

The above-mentioned bidirectional communication between the induction heating cooker 100 (wireless power feeding apparatus) and the power receiving apparatus 200 allows for improved control of the induction heating cooker 100 and the power receiving apparatus 200 and also enhanced protection function.

As described above, the induction heating cooker 100 according to Embodiment 1 includes the primary-side communication device 47 disposed below the top plate 4, the magnetic shield ring 75 disposed between the primary-side communication device 47 and an induction heating coil, and the magnetic shield plate 32a disposed on the lower surface of the primary-side communication device 47.

This configuration makes it possible to reduce a high-frequency magnetic field that reaches the primary-side communication device 47 from the induction heating coil. Consequently, the influence of communication noise due to the high-frequency magnetic field generated from the induction heating coil can be reduced, thus enhancing the quality of communication. This makes it possible to reduce communication disturbance in the radio communication between the primary-side communication device 47 and the secondary-side communication device 85 of the power receiving apparatus 200.

In Embodiment 1, the magnetic shield ring 75 is formed in an annular shape, and surrounds the outer periphery of the induction heating coil.

This configuration makes it possible to reduce a high-frequency magnetic field that reaches the primary-side communication device 47 from the induction heating coil.

In Embodiment 1, the primary-side communication device 47 is disposed at a position not overlapping the terminal block 70 with respect to the vertical direction.

This configuration reduces the possibility of reaching the primary-side communication device 47 of the high-frequency magnetic field from the terminal block 70, thus making it possible to reduce the influence of noise.

In Embodiment 1, the primary-side communication device 47 and the secondary-side communication device 85 are each disposed at a position such that the strength of the high-frequency magnetic field generated from the induction heating coil is less than the radio field strength of the radio communication between the primary-side communication device 47 and the secondary-side communication device 85.

This configuration helps reduce the influence of communication noise resulting from the high-frequency magnetic field generated from the induction heating coil, thus reducing interference with the radio communication between the primary-side communication device 47 and the secondary-side communication device 85.

(Modification 1)

The following describes a modification of the respective magnetic shield plates of the induction heating cooker 100 and power receiving apparatus 200.

Figure 5:
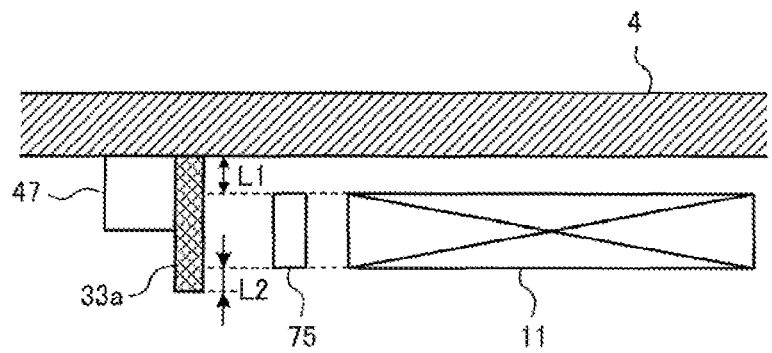
FIG. 5 schematically illustrates a modification of a magnetic shield plate of the induction heating cooker according to Embodiment 1 of the present invention.

FIG. 5 schematically illustrates a modification of a magnetic shield plate of the induction heating cooker according to Embodiment 1 of the present invention.

As illustrated in FIG. 5, a magnetic shield plate 33a made of an electric conductor or a magnetic body may be disposed on a lateral surface of the primary-side communication device 47.

The magnetic shield plate 33a is disposed on a lateral surface of the primary-side communication device 47 that faces the first induction heating coil 11. The magnetic shield plate 33a is formed in, for example, a plate-like shape, and disposed in contact with the lateral surface of the primary-side communication device 47. Desirably, in plan view as seen from the first induction heating coil 11, the magnetic shield plate 33a is larger in area than the primary-side communication device 47. The magnetic shield plate 33a may not necessarily have the above-mentioned size but may have any size as long as the magnetic shield plate 33a is disposed at least on a portion of the lateral surface of the primary-side communication device 47.

This configuration also helps reduce a high-frequency magnetic field that reaches the primary-side communication device 47 from the induction heating coil.

The upper end of the magnetic shield plate 33a is positioned above the upper end of the first induction heating coil 11. For example, as illustrated in FIG. 5, the upper end of the magnetic shield plate 33a is positioned at a distance L1 above the upper end of the first induction heating coil 11. The upper end of the magnetic shield plate 33a may be positioned in contact with the bottom surface of the top plate 4.

Positioning the magnetic shield plate 33a as described above helps reduce the possibility of reaching the primary-side communication device 47 from the lateral side and from above, of a high-frequency magnetic field generated by the induction heating coil The lower end of the magnetic shield plate 33a is positioned below the lower end of the first induction heating coil 11. For example, as illustrated in FIG. 5, the lower end of the magnetic shield plate 33a is positioned at a distance L2 below the lower end of the first induction heating coil 11.

Positioning the magnetic shield plate 33a as described above helps reduce the possibility of reaching the primary-side communication device 47 from the lateral side and from below, of a high-frequency magnetic field generated by the induction heating coil.

Figure 6:
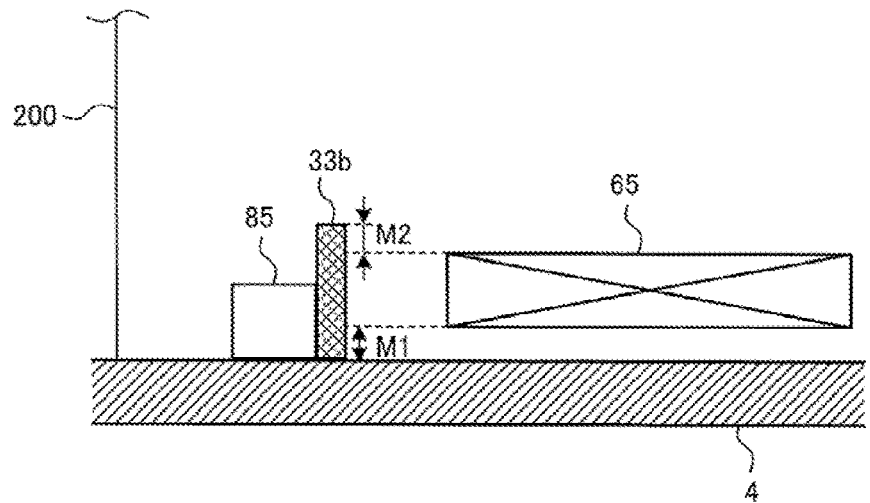
FIG. 6 schematically illustrates a modification of a magnetic shield plate of the power receiving apparatus according to Embodiment 1 of the present invention.

FIG. 6 schematically illustrates a modification of a magnetic shield plate of the power receiving apparatus according to Embodiment 1 of the present invention.

As illustrated in FIG. 6, a magnetic shield plate 33b made of an electric conductor or a magnetic body may be disposed on a lateral surface of the secondary-side communication device 85.

The magnetic shield plate 33b is disposed on a lateral surface of the secondary-side communication device 85 that faces the power receiving coil 65. The magnetic shield plate 33b is formed in, for example, a plate-like shape, and disposed in contact with the lateral surface of the secondary-side communication device 85. Desirably, in plan view as seen from the power receiving coil 65, the magnetic shield plate 33b is larger in area than the secondary-side communication device 85. The magnetic shield plate 33b may not necessarily have the above-mentioned size but may have any size as long as the magnetic shield plate 33b is disposed at least on a portion of the lateral surface of the secondary-side communication device 85.

This configuration also helps reduce a high-frequency magnetic field that reaches the secondary-side communication device 85 from the induction heating coil.

The upper end of the magnetic shield plate 33b is positioned above the upper end of the power receiving coil 65. For example, as illustrated in FIG. 6, the upper end of the magnetic shield plate 33b is positioned at a distance M2 above the upper end of the power receiving coil 65.

Positioning the magnetic shield plate 33b as described above helps reduce the possibility of reaching the secondary-side communication device 85 from the lateral side and from above, of a high-frequency magnetic field generated by the induction heating coil.

The lower end of the magnetic shield plate 33b is positioned below the lower end of the power receiving coil 65. For example, as illustrated in FIG. 6, the lower end of the magnetic shield plate 33b is positioned at a distance M1 below the lower end of the power receiving coil 65. The lower end of the magnetic shield plate 33b may be positioned in contact with the bottom surface of the housing of the power receiving apparatus 200.

Positioning the magnetic shield plate 33b as described above helps reduce the possibility of reaching the primary-side communication device 47 from the lateral side. of a high-frequency magnetic field generated by the induction heating coil.

(Modification 2)

Figure 7:
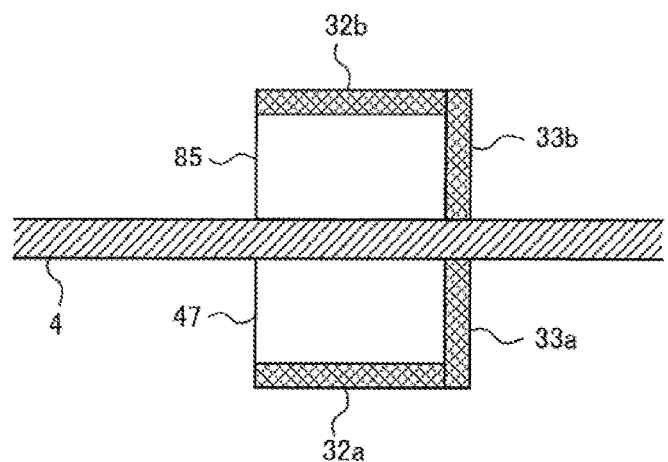
FIG. 7 schematically illustrates a modification of the respective magnetic shield plates of the induction heating cooker and power receiving apparatus according to Embodiment 1 of the present invention.

FIG. 7 schematically illustrates a modification of the respective magnetic shield plates of the induction heating cooker and power receiving apparatus according to Embodiment 1 of the present invention.

As illustrated in FIG. 7, the magnetic shield plate 32a may be disposed on the lower surface of the primary-side communication device 47, and the magnetic shield plate 33a may be disposed on a lateral surface that faces the first induction heating coil 11 of the primary-side communication device 47. The magnetic shield plate 32a may be formed to have substantially the same area as the lower surface of the primary-side communication device 47. The magnetic shield plate 33a may be formed to have substantially the same area as the lateral surface of the primary-side communication device 47.

The magnetic shield plate 32b may be disposed on the upper surface of the secondary-side communication device 85, and the magnetic shield plate 33b may be disposed on a lateral surface that faces the power receiving coil 65 of the secondary-side communication device 85. The magnetic shield plate 32b may be formed to have substantially the same area as the upper surface of the secondary-side communication device 85. The magnetic shield plate 33b may be formed to have substantially the same area as the lateral surface of the secondary-side communication device 85.

The above-mentioned configuration also helps reduce the possibility of reaching the primary-side communication device 47 from the lateral side and from below, of a high-frequency magnetic field generated by the induction heating coil. Further, the above-mentioned configuration helps reduce the possibility of a high-frequency magnetic field generated by the induction heating coil reaching the secondary-side communication device 85 from the lateral side and from above.

(Modification 3)

Figure 8:
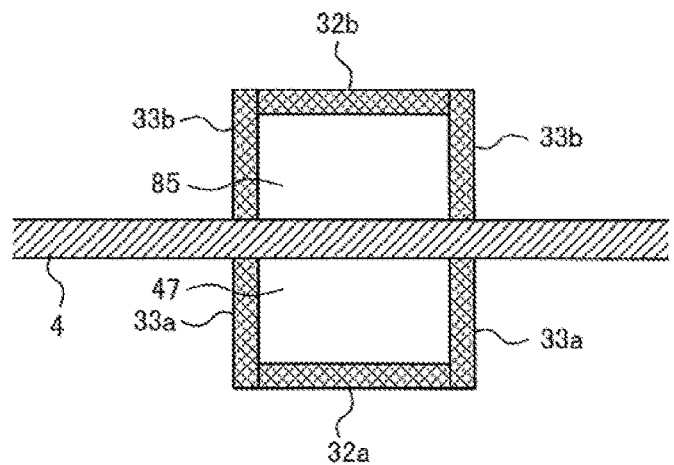
FIG. 8 schematically illustrates a modification of the respective magnetic shield plates of the induction heating cooker and power receiving apparatus according to Embodiment 1 of the present invention.

FIG. 8 schematically illustrates a modification of the respective magnetic shield plates of the induction heating cooker and power receiving apparatus according to Embodiment 1 of the present invention.

As illustrated in FIG. 8, the magnetic shield plate 32a may be disposed on the lower surface of the primary-side communication device 47, and the magnetic shield plate 33a may be disposed to surround each lateral surface of the primary-side communication device 47. The magnetic shield plate 32a may be formed to have substantially the same area as the lower surface of the primary-side communication device 47. The magnetic shield plate 33a may be formed to have substantially the same area as each lateral surface of the primary-side communication device 47. The magnetic shield plate 33a may be formed in a tubular shape, or may be formed as a combination of flat-shaped members.

The magnetic shield plate 32b may be disposed on the upper surface of the secondary-side communication device 85, and the magnetic shield plate 33b may be disposed to surround each lateral surface of the secondary-side communication device 85. The magnetic shield plate 32b may be formed to have substantially the same area as the upper surface of the secondary-side communication device 85. The magnetic shield plate 33b may be formed to have substantially the same area as each lateral surface of the secondary-side communication device 85. The magnetic shield plate 33b may be formed in a tubular shape, or may be formed as a combination of flat-shaped members.

The above-mentioned configuration also helps reduce the possibility of reaching the primary-side communication device 47 from the lateral side and from below, of a high-frequency magnetic field generated by the induction heating coil. Further, the above-mentioned configuration helps reduce the possibility of reaching the secondary-side communication device 85 from the lateral side and from above a high-frequency magnetic field generated by the induction heating coil.

The magnetic shield plate 33a may be disposed on only some of the lateral surfaces of the primary-side communication device 47. For example, among the lateral surfaces of the primary-side communication device 47, the magnetic shield plate 33a may be disposed only on a lateral surface facing the first induction heating coil 11, and on a lateral surface on the other side than the lateral surface facing the first induction heating coil 11.

The magnetic shield plate 33b may be disposed on only some of the lateral surfaces of the secondary-side communication device 85. For example, among the lateral surfaces of the secondary-side communication device 85, the magnetic shield plate 33b may be disposed only on a lateral surface facing the power receiving coil 65, and on a lateral surface on the other side than the lateral surface facing the power receiving coil 65.

The "magnetic shield plate 33a" according to each of Modifications 1 to 3 corresponds to "second magnetic shield member" according to the present invention. Further, the "magnetic shield plate 33b" corresponds to "third magnetic shield member" according to the present invention.

(Modification 4)

Figure 9:
FIG. 9 is a perspective view schematically illustrating a modification of a magnetic shield plate of the induction heating cooker according to Embodiment 1 of the present invention.

FIG. 9 is a perspective view schematically illustrating a modification of a magnetic shield plate of the induction heating cooker according to Embodiment 1 of the present invention.

Figure 10:
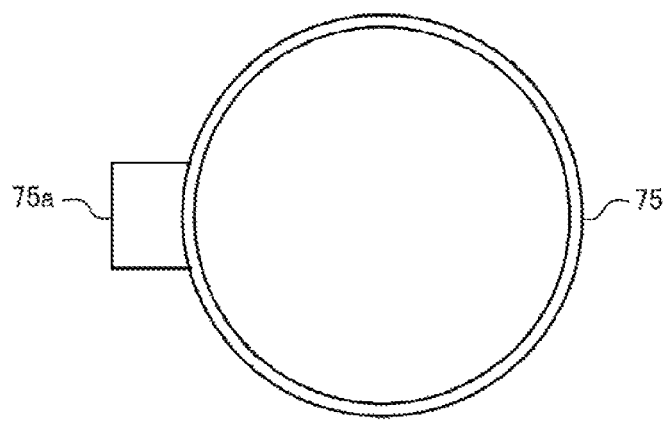
FIG. 10 is a top view schematically illustrating a modification of a magnetic shield plate of the induction heating cooker according to Embodiment 1 of the present invention.

FIG. 10 is a top view schematically illustrating a modification of a magnetic shield plate of the induction heating cooker according to Embodiment 1 of the present invention.

Figure 11:
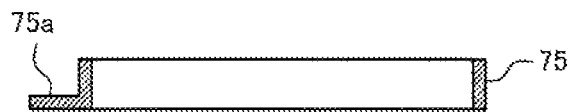
FIG. 11 is a longitudinal sectional view schematically illustrating a modification of a magnetic shield plate of the induction heating cooker according to Embodiment 1 of the present invention.

FIG. 11 is a longitudinal sectional view schematically illustrating a modification of a magnetic shield plate of the induction heating cooker according to Embodiment 1 of the present invention.

As illustrated in FIGS. 9 to 11, the magnetic shield ring 75 is integrally provided with an extension 75a that extends laterally outward from the lower end of the magnetic shield ring 75. As seen in plan view from the power receiving apparatus 200, the extension 75a is substantially the same in area as the primary-side communication device 47, or is larger in area than the primary-side communication device 47. The primary-side communication device 47 is disposed on the upper surface of the extension 75a of the magnetic shield ring 75.

As a result of this configuration, the extension 75a, which is formed integrally with the magnetic shield ring 75, functions as a magnetic shield member. This helps reduce the possibility of reaching the primary-side communication device 47 from below of a high-frequency magnetic field generated by the induction heating coil. Since the extension 75a serving as a magnetic shield member is formed integrally with the magnetic shield ring 75, the number of components can be reduced.

The "magnetic shield plate 75a" according to Modification 4 corresponds to "second magnetic shield member" according to the present invention.

(Modification 5)

Figure 12:
FIG. 12 is a perspective view schematically illustrating a modification of a magnetic shield plate of the induction heating cooker according to Embodiment 1 of the present invention.

FIG. 12 is a perspective view schematically illustrating a modification of a magnetic shield plate of the induction heating cooker according to Embodiment 1 of the present invention.

Figure 13:
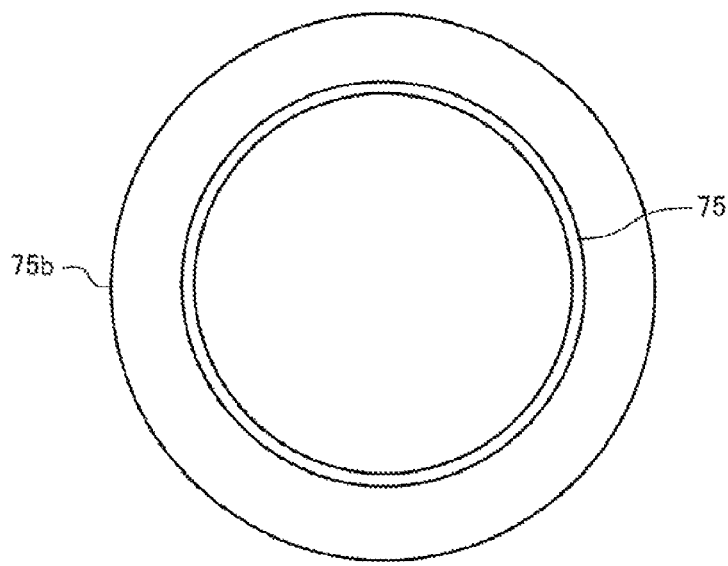
FIG. 13 is a top view schematically illustrating a modification of a magnetic shield plate of the induction heating cooker according to Embodiment 1 of the present invention.

FIG. 13 is a top view schematically illustrating a modification of a magnetic shield plate of the induction heating cooker according to Embodiment 1 of the present invention.

Figure 14:
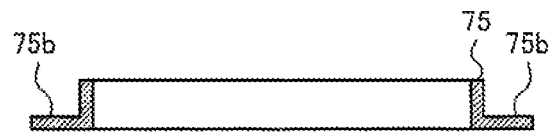
FIG. 14 is a longitudinal sectional view schematically illustrating a modification of a magnetic shield plate of the induction heating cooker according to Embodiment 1 of the present invention.

FIG. 14 is a longitudinal sectional view schematically illustrating a modification of a magnetic shield plate of the induction heating cooker according to Embodiment 1 of the present invention.

As illustrated in FIG. 12 to FIG. 14, the magnetic shield ring 75 is integrally provided with a flange 75b that extends circumferentially outward from the lower end of the magnetic shield ring 75. The flange 75b is formed such that, in plan view as seen from the power receiving apparatus 200, the distance between the outer periphery of the flange 75b and its inner periphery is substantially equal to the width of the primary-side communication device 47, or is greater than the width of the primary-side communication device 47. The primary-side communication device 47 is disposed on the upper surface of the flange 75b of the magnetic shield ring 75.

As a result of this configuration, the flange 75b, which is formed integrally with the magnetic shield ring 75, functions as a magnetic shield member. This helps reduce the possibility of reaching the primary-side communication device 47 from below, of a high-frequency magnetic field generated by the induction heating coil. Since the flange 75b serving as a magnetic shield member is formed integrally with the magnetic shield ring 75, the number of components can be reduced.

The "flange 75b" according to Modification 5 corresponds to "second magnetic shield member" according to the present invention.

Embodiment 2

The following description of Embodiment 2 will be directed to a configuration in which the primary-side communication device 47 and the secondary-side communication device 85 are placed by taking into account the influence of high-frequency magnetic fields generated from a plurality of induction heating coils.

Features identical to those of Embodiment 1 mentioned above will be designated by the same reference signs and will not be described in further detail.

Figure 15:
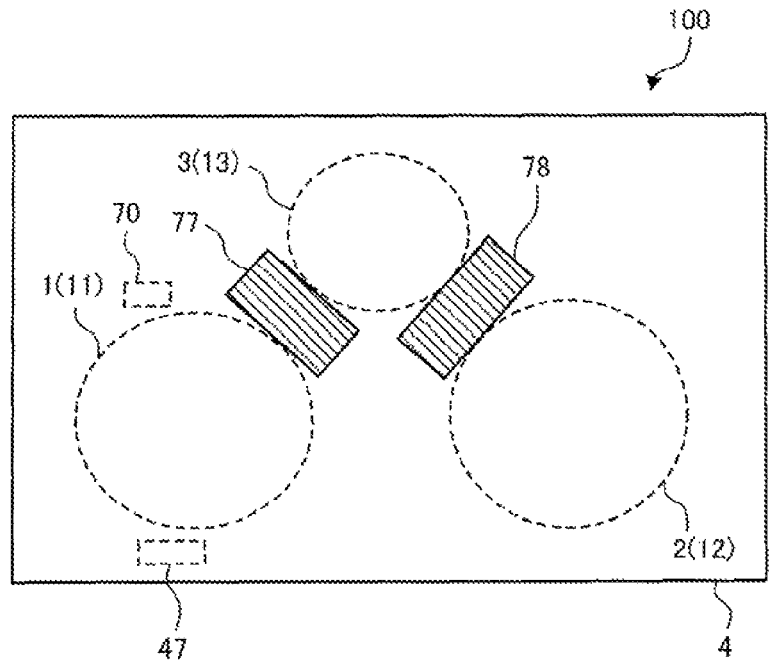
FIG. 15 is a top view schematically illustrating the location of a primary-side communication device of an induction heating cooker according to Embodiment 2 of the present invention.

FIG. 15 is a top view schematically illustrating the location of a primary-side communication device of an induction heating cooker according to Embodiment 2 of the present invention.

As illustrated in FIG. 15, the top plate 4 of the induction heating cooker 100 is provided with the first induction heating zone 1, the second induction heating zone 2, and the third induction heating zone 3. The first induction heating zone 1 and the second induction heating zone 2 are arranged side by side in the lateral direction, at a location near the front edge of the top plate 4. The third induction heating zone 3 is located behind the first induction heating zone 1 and the second induction heating zone 2, substantially at the center in the lateral direction of the top plate 4. The first induction heating coil 11, the second induction heating coil 12, and the third induction heating coil 13 are respectively disposed under the first induction heating zone 1, the second induction heating zone 2, and the third induction heating zone 3.

With the above-mentioned configuration, upon simultaneous activation of a plurality of induction heating coils, a high-frequency magnetic field is generated from each of the induction heating coils. Consequently, in the region between adjacent induction heating coils, the high-frequency magnetic fields from the respective induction heating coils become superimposed on each other. The strength of the resulting high-frequency magnetic field in this region thus increases. In other words, in the region between adjacent induction heating coils, the presence of such a high-frequency magnetic field tends to cause interference with the radio communication between the primary-side communication device 47 and the secondary-side communication device 85.

Accordingly, for the above-mentioned reason, the primary-side communication device 47 and the secondary-side communication device 85 are each disposed at a position such that the sum of the strengths of respective high-frequency magnetic fields generated from a plurality of induction heating coils is less than the radio field strength of the radio communication between the primary-side communication device 47 and the secondary-side communication device 85.

That is, the primary-side communication device 47 and the secondary-side communication device 85 are not located in a direction perpendicular to a region 77, which lies between the first induction heating zone 1 (first induction heating coil 11) and the third induction heating zone 3 (third induction heating coil 13). In other words, the primary-side communication device 47 and the secondary-side communication device 85 are each disposed at a position such that the level of communication noise due to the respective high-frequency magnetic fields generated from the first induction heating coil 11 and the second induction heating coil 12 is below the output level at the communication frequency of the radio communication between the primary-side communication device 47 and the secondary-side communication device 85.

For example, the primary-side communication device 47 and the secondary-side communication device 85 are each disposed at a position such that, when the high-frequency current supplied to each of the first induction heating coil 11 and the third induction heating coil 13 is at its maximum value, the sum of the strengths of the respective high-frequency magnetic fields generated from the first induction heating coil 11 and the third induction heating coil 13 is less than the radio field strength at the frequency of communication between the primary-side communication device 47 and the secondary-side communication device 85.

The primary-side communication device 47 and the secondary-side communication device 85 are not located in a direction perpendicular to a region 78, which lies between the second induction heating zone 2 (second induction heating coil 12) and the third induction heating zone 3 (third induction heating coil 13). In other words, the primary-side communication device 47 and the secondary-side communication device 85 are each disposed at a position such that the level of communication noise due to the respective high-frequency magnetic fields generated from the second induction heating coil 12 and the third induction heating coil 13 is below the output level at the communication frequency of the radio communication between the primary-side communication device 47 and the secondary-side communication device 85.

For example, the primary-side communication device 47 and the secondary-side communication device 85 are each disposed at a position such that, when the high-frequency current supplied to each of the second induction heating coil 12 and the third induction heating coil 13 is at its maximum value, the sum of the strengths of the respective high-frequency magnetic fields generated from the second induction heating coil 12 and the third induction heating coil 13 is less than the radio field strength at the frequency of communication between the primary-side communication device 47 and the secondary-side communication device 85.

As described above, in Embodiment 2, the primary-side communication device 47 and the secondary-side communication device 85 are each disposed at a position such that the strength of high-frequency magnetic fields generated from a plurality of induction heating coils is less than the radio field strength of the radio communication between the primary-side communication device 47 and the secondary-side communication device 85.

This configuration helps reduce the influence of communication noise resulting from high-frequency magnetic fields generated from a plurality of induction heating coils, thus reducing interference with the radio communication between the primary-side communication device 47 and the secondary-side communication device 85.
(Modification 1)

Figure 16:
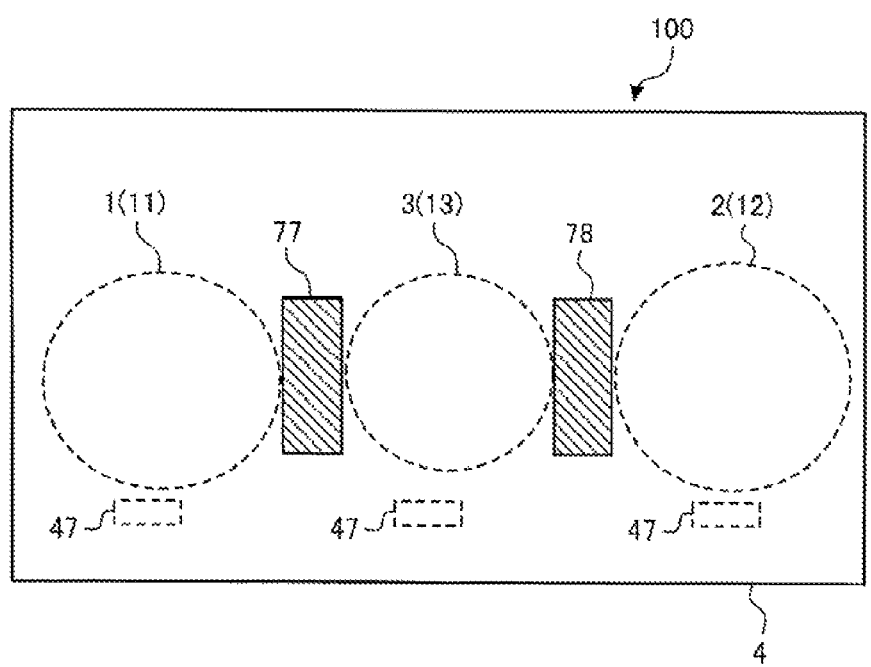
FIG. 16 is a top view schematically illustrating a modification of the location of each induction heating coil of the induction heating cooker according to Embodiment 2 of the present invention.

FIG. 16 is a top view schematically illustrating a modification of the location of each induction heating coil of the induction heating cooker according to Embodiment 2 of the present invention.

As illustrated in FIG. 16, the first induction heating zone 1 (first induction heating coil 11), the second induction heating zone 2 (second induction heating coil 12), and the third induction heating zone 3 (third induction heating coil 13) may be arranged side by side in the lateral direction of the top plate 4. FIG. 16 depicts a case in which the primary-side communication device 47 is located in front of each induction heating zone.

For this configuration as well, the primary-side communication device 47 and the secondary-side communication device 85 are not located in a direction perpendicular to the region 77, which lies between the first induction heating zone 1 (first induction heating coil 11) and the third induction heating zone 3 (third induction heating coil 13). Further, the primary-side communication device 47 and the secondary-side communication device 85 are not located in a direction perpendicular to the region 78, which lies between the second induction heating zone 2 (second induction heating coil 12) and the third induction heating zone 3 (third induction heating coil 13).

This configuration helps reduce the influence of communication noise resulting from high-frequency magnetic fields generated from a plurality of induction heating coils, thus reducing interference with the radio communication between the primary-side communication device 47 and the secondary-side communication device 85.

Embodiment 3

The following description of Embodiment 3 will be directed to a configuration with a plurality of primary-side communication devices 47.

The configuration and operation of the induction heating cooker 100 according to Embodiment 3 will be described below while focusing on differences from Embodiments 1 and 2 mentioned above.
(Configuration)

Figure 17:
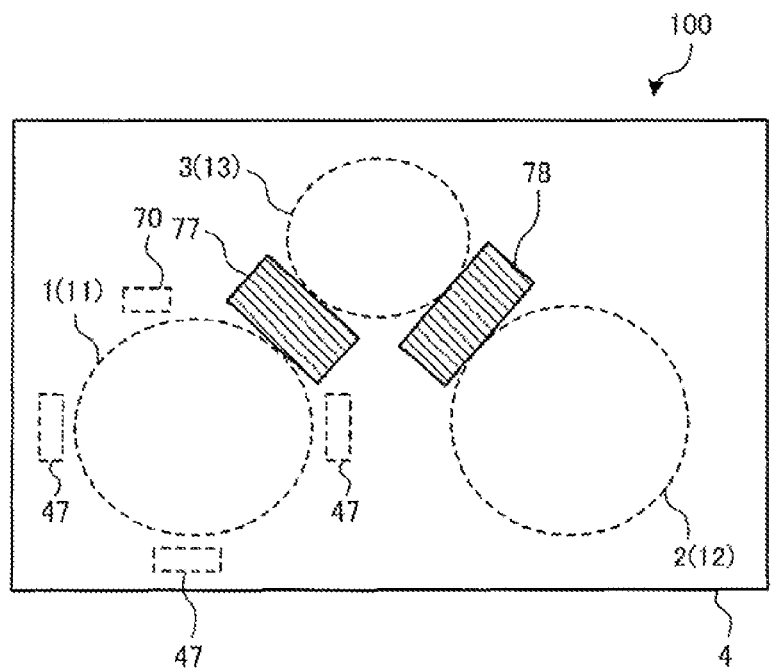
FIG. 17 is a top view schematically illustrating the location of each primary-side communication device of an induction heating cooker according to Embodiment 3 of the present invention.

FIG. 17 is a top view schematically illustrating the location of each primary-side communication device of an induction heating cooker according to Embodiment 3 of the present invention.

The induction heating cooker 100 according to Embodiment 3 includes a plurality of primary-side communication devices 47 provided for one heating zone. As with Embodiment 1 described above, the primary-side communication devices 47 are each disposed at a position not overlapping the terminal block 70 with respect to the vertical direction. Further, as with Embodiment 2 described above, the primary-side communication devices 47 are each disposed at a position other than the region 77. For example, as illustrated in FIG. 17, the primary-side communication devices 47 are disposed in front of, to the right of, and to the left of the first induction heating zone 1 (first induction heating coil 11).

Each of the primary-side communication devices 47 performs radio communication when the secondary-side communication device 85 of the power receiving apparatus 200 is placed at a distance that allows communication with the primary-side communication device 47. The power receiving apparatus 200 may be also provided with a plurality of secondary-side communication devices 85.

The control unit 45 is connected with each of the primary-side communication devices 47. The control unit 45 uses the primary-side communication devices 47 to transmit and receive communication information.

Other features, such as the magnetic shield ring 75 and the magnetic shield plate 32a, are identical or similar to Embodiment 1 described above.
(Operation)

A communication operation according to Embodiment 3 will be described below.

When the power receiving apparatus 200 is placed on the top plate 4, and the induction heating cooker 100 starts to operate, a plurality of primary-side communication devices 47 each start radio communication.

If the secondary-side communication device 85 is present at a distance that allows communication with one or more of the primary-side communication devices 47, communication information is transmitted and received between the one or more primary-side communication devices 47 and the secondary-side communication device 85. At this time, each such primary-side communication device 47 acquires information about the radio field strength of its radio communication, and outputs the acquired information to the control unit 45.

The control unit 45 acquires information on radio field strength from each of the primary-side communication devices 47, and selectively performs communication in accordance with the radio field strength.

In one example, the control unit 45 performs radio communication by using, among a plurality of primary-side communication devices 47, at least one primary-side communication device 47 with a radio field strength greater than or equal to a preset level.

In another example, the control unit 45 selects, from among a plurality of primary-side communication devices 47, the primary-side communication device 47 with the maximum radio field strength, and performs radio communication by using the selected primary-side communication device 47.

In another example, the control unit 45 selects, from among a plurality of primary-side communication devices 47, one or more primary-side communication devices 47 other than the primary-side communication device 47 with the minimum radio field strength, and performs radio communication by using the one or more primary-side communication devices 47.

In another example, the control unit 45 selects, from among a plurality of primary-side communication devices 47, one or more primary-side communication devices 47 other than at least one primary-side communication device 47 with a radio field strength less than a preset level, and performs radio communication by using the one or more primary-side communication devices 47.

The subsequent operation is identical or similar to Embodiment 1 described above. That is, operation of the induction heating cooker 100 including the driving circuit 50 is controlled in accordance with information received via radio communication from the power receiving apparatus 200.

As described above, in Embodiment 3, the control unit 45 controls operation of the induction heating cooker 100 based on communication information on at least one of a plurality of primary-side communication devices 47.

Consequently, radio communication can be performed by selecting, from among a plurality of primary-side communication devices 47, at least one primary-side communication device 47 located at a position with comparatively less communication noise. This makes it possible to effectively increase the accuracy of radio communication between the primary-side communication device 47 and the secondary-side communication device 85.

Embodiment 4

The following description of Embodiment 4 will be directed to a configuration in which the power receiving apparatus 200 includes a housing that accommodates the power receiving coil 65, and a housing that accommodates the secondary-side communication device 85.

The configuration of the induction heating cooker 100 according to Embodiment 4 will be described below while focusing on differences from Embodiments 1 to 3 mentioned above.

Figure 18:
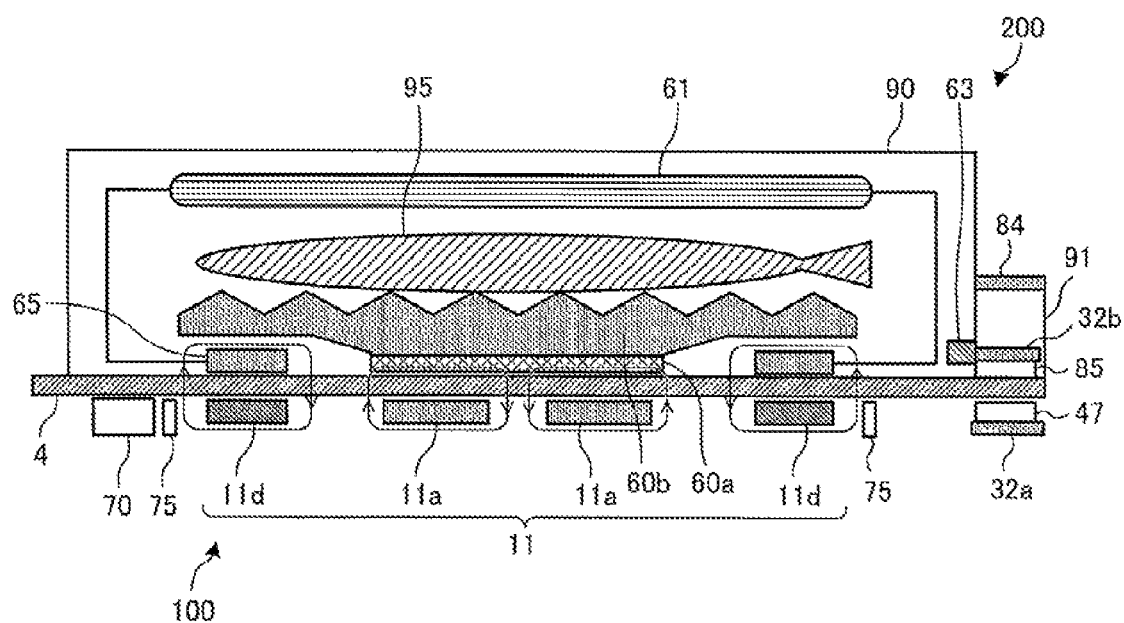
FIG. 18 is a sectional view illustrating the configuration of an induction heating cooker (wireless power feeding apparatus) according to Embodiment 4 of the present invention, and the configuration of a power receiving apparatus placed on the top plate of the induction heating cooker.

FIG. 18 is a sectional view illustrating the configuration of an induction heating cooker (wireless power feeding apparatus) according to Embodiment 4 of the present invention, and the configuration of a power receiving apparatus placed on the top plate of the induction heating cooker.

In FIG. 18, the first induction heating coil 11 of the induction heating cooker 100 according to Embodiment 4 includes an inner-periphery coil 11a, and a plurality of outer-periphery coils 11d. The inner-periphery coil 11a, and each outer-periphery coil 11d are driven by different driving circuits 50.

As with Embodiments 1 to 3 described above, the magnetic shield ring 75 is disposed around the outer periphery of the first induction heating coil 11. The primary-side communication device 47 is disposed at a position farther from the outer periphery of the first induction heating coil 11 than the magnetic shield ring 75 and not overlapping the terminal block 70. The magnetic shield plate 32a is disposed on the lower surface of the primary-side communication device 47.

The power receiving apparatus 200 according to Embodiment 4 is, for example, an appliance for cooking a cooked item 95, which is an item of food to be cooked such as fish. In the power receiving apparatus 200, a first housing 90 and a second housing 91 are disposed adjacent to each other.

The first housing 90 includes a heating chamber defined inside the first housing 90 to accommodate the cooked item 95. A magnetic body 60a, a cooking table 60b, a top heater 61, a temperature sensor 63, and the power receiving coil 65 are disposed in the power receiving apparatus 200.

The magnetic body 60a is made of, for example, a magnetic material such as iron, and inductively heated by a high-frequency magnetic field generated from the inner-periphery coil 11a. The cooking table 60b is disposed in contact with the upper surface of the magnetic body 60a, and heats the cooked item 95 with the heat conducted from the magnetic body 60a. The power receiving coil 65 receives power from the outer-periphery coil 11d. The top heater 61 is connected to the power receiving coil 65, and generates heat with the power received from the power receiving coil 65. The temperature sensor 63 is disposed inside the heating chamber of the first housing 90 to detect temperature inside the heating chamber. Information on the temperature detected by the temperature sensor 63 is transmitted by the secondary-side communication device 85.

Although an appliance for performing induction heating and heating that uses a heater is described as the power receiving apparatus 200 in Embodiment 4, the power receiving apparatus 200 according to the present invention is not limited to such an appliance.

The secondary-side communication device 85 is disposed inside the second housing 91. The magnetic shield plate 32b is disposed on the upper surface of the secondary-side communication device 85. The second housing 91 is located at a position including the primary-side communication device 47 with respect to the vertical direction when the power receiving apparatus 200 is placed on a heating zone on the top plate 4. For example, the primary-side communication device 47 is located forward of the corresponding heating zone on the top plate 4, and the second housing 91 is located forward of the first housing 90 and adjacent to the first housing 90.

That is, the second housing 91 is configured such that the secondary-side communication device 85 accommodated in the second housing 91, and the primary-side communication device 47 are positioned facing or in proximity to each other if the top plate 4 were not provided. In this configuration, the top plate 4 intervenes between the primary-side communication device 47 and the secondary-side communication device 85.

As with Embodiment 2 described above, the second housing 91 is not disposed in the regions 77 and 78, which are regions between adjacent induction heating coils.

The second housing 91 is lower in height than the first housing 90. In other words, in side view of the power receiving apparatus 200, the second housing 91 has a shape that projects outward from the first housing 90.

The area where the first housing 90 and the second housing 91 are disposed adjacent to each other may be made of, for example, an electric conductor to provide improved magnetic shielding effect.

The secondary display/operating unit 84 is disposed on the upper surface of the second housing 91. The secondary display/operating unit 84 serves both as an operating unit to perform an input operation for the power receiving apparatus 200, and as a display unit to display information related to operation of the power receiving apparatus. The input operation and the display unit may be provided separately.

Examples of the secondary display/operating unit 84 acting as an operating unit include mechanical switches, such as push switches and tactile switches, and touch switches or other such switches that detect an input operation based on a change in electrode capacitance. Examples of the secondary display/operating unit 84 acting as a display unit include a liquid crystal device (LCD) and an LED.

The secondary display/operating unit 84 may not necessarily be disposed at the position mentioned above but may be disposed at any given position on the second housing 91. For example, the secondary display/operating unit 84 may be divided into an operating unit and a display unit, such that the operating unit is disposed on the lateral surface of the second housing 91, and the operating unit is disposed on the upper surface of the second housing 91.

As described above, in Embodiment 4, the power receiving apparatus 200 includes the first housing 90 that accommodates the power receiving coil 65, and the second housing 91 that is disposed adjacent to the first housing 90 and accommodates the secondary-side communication device 85.

This configuration provides the following advantage in addition to those provided by Embodiments 1 to 3 mentioned above. That is, components related to receiving of power, and components related to radio communication can be placed in different housings, thus further reducing interference with the radio communication between the primary-side communication device 47 and the secondary-side communication device 85 of the power receiving apparatus 200. Other advantages include, for example, the ability to prevent conduction of heat to the secondary-side communication device 85 if the power receiving apparatus 200 is an appliance used for cooking that uses heat.

In Embodiment 4, the secondary display/operating unit 84 is disposed on the second housing 91. As a result, it is possible to make effective use of the second housing 91 that laterally projects outward from the first housing 90.

REFERENCE SIGNS LIST

1 first induction heating zone 2 second induction heating zone 3 third induction heating zone 4 top plate 5 heating target object 11 first induction heating coil 11-1 to 11-4 coil 11a inner-periphery coil 11d outer-periphery coil 12 second induction heating coil 13 third induction heating coil 21 alternating-current power supply 22 direct-current power supply circuit 22a diode bridge 22b reactor 22c smoothing capacitor 23 input-current detecting unit 24 power-transmitting-side resonant capacitor 25 coil-current detecting unit 32a magnetic shield plate 32b magnetic shield plate 33a magnetic shield plate 33b magnetic shield plate 40 operating unit 40a operating unit 40b operating unit 40c operating unit 41 display unit 41a display unit 41b display unit 41c display unit 43 operating/display unit 45 controller 46 load determination unit 47 primary-side communication device 48 memory 50 driving circuit 60a magnetic body 60b cooking table 61 top heater 62 power-receiving-side resonant capacitor 63 temperature sensor 65 power receiving coil 70 terminal block 71 wiring 72 wiring 75 magnetic shield ring 75a extension 75b flange 76 magnetic shield ring 77 region 78 region 81 power receiving circuit 82 load circuit 83 secondary control unit 84 display/operating unit 85 secondary-side communication device 90 first housing 91 second housing 95 cooked item 100 induction heating cooker 123 inverter circuit 123a IGBT 123b IGBT 123c diode 123d diode 200 power receiving apparatus

The invention claimed is:

1. A wireless power transfer apparatus for transferring power to a power receiving apparatus, the wireless power transfer apparatus comprising:
a support on which the power receiving apparatus is placed;
a coil disposed below the support and configured to generate a high-frequency magnetic field upon receiving supply of a high-frequency current;
a communication device disposed below the support and configured to perform radio communication with the power receiving apparatus;
a first magnetic shield member made of an electric conductor, the first magnetic shield member being disposed between the communication device and the coil; and
a second magnetic shield member made of an electric conductor or a magnetic body, the second magnetic shield member being disposed on at least one of a lower surface and a lateral surface of the communication device,
wherein the first magnetic shield member and the second magnetic shield member are formed integrally with each other.

2. The wireless power transfer apparatus of claim 1, wherein the first magnetic shield member is a magnetic shield ring that is formed in an annular shape and surrounds an outer periphery of the coil.

3. The wireless power transfer apparatus of claim 1, wherein the second magnetic shield member is disposed on a lateral surface of the communication device that faces the coil.

4. The wireless power transfer apparatus of claim 1, wherein the second magnetic shield member is configured to surround a lateral surface of the communication device.

5. The wireless power transfer apparatus of claim 1, wherein the second magnetic shield member is disposed on a lateral surface of the communication device, and an upper end of the second magnetic shield member is positioned above an upper end of the coil.

6. The wireless power transfer apparatus of claim 1, wherein the second magnetic shield member is disposed on a lateral surface of the communication device, and a lower end of the second magnetic shield member is positioned below a lower end of the coil.

7. The wireless power transfer apparatus of claim 1, wherein the communication device is disposed at a position such that a strength of the high-frequency magnetic field generated from the coil is less than a radio field strength of radio communication between the communication device and the power receiving apparatus.

8. The wireless power transfer apparatus of claim 1, comprising
a plurality of the coils,
wherein the communication device is disposed at a position such that a sum of strengths of the high-frequency magnetic fields generated from the plurality of coils is less than a radio field strength of radio communication between the communication device and the power receiving apparatus.

9. The wireless power transfer apparatus of claim 1, comprising:
a plurality of the communication devices; and
a controller configured to control operation of the wireless power transfer apparatus based on communication information of at least one communication device among the plurality of communication devices.

10. A wireless power transfer system comprising:
the wireless power transfer apparatus of claim 1, and
a power receiving apparatus detachably supported on the wireless power transfer apparatus,
wherein the power receiving apparatus includes
a power receiving coil configured to receive power from the coil when placed within the high-frequency magnetic field generated by the coil,
a second communication device configured to perform radio communication with the communication device of the wireless power transfer apparatus, and
a third magnetic shield member made of an electric conductor or a magnetic body, the third magnetic shield member being disposed on at least one of an upper surface and a lateral surface of the second communication device.

11. The wireless power transfer system of claim 10, wherein the third magnetic shield member is disposed on a lateral surface of the second communication device that faces the power receiving coil.

12. The wireless power transfer system of claim 10, wherein the third magnetic shield member surrounds a lateral surface of the second communication device.

13. The wireless power transfer system of claim 10, wherein the third magnetic shield member is disposed on a lateral surface of the second communication device, and an upper end of the third magnetic shield member is positioned above an upper end of the power receiving coil.

14. The wireless power transfer system of claim 10, wherein the third magnetic shield member is disposed on a lateral surface of the second communication device, and a lower end of the third magnetic shield member is positioned below a lower end of the power receiving coil.

15. A wireless power transfer apparatus for transferring power to a power receiving apparatus, the wireless power transfer apparatus, comprising:
a support on which the power receiving apparatus is placed;
a coil disposed below the support, the coil generating a high-frequency magnetic field upon receiving supply of a high-frequency current;
a communication device disposed below the support to perform radio communication with the power receiving apparatus;
a first magnetic shield member made of an electric conductor, the first magnetic shield member being disposed between the communication device and the coil;
a second magnetic shield member made of an electric conductor or a magnetic body, the second magnetic shield member being disposed on at least one of a lower surface and a lateral surface of the communication device;
an inverter circuit configured to supply a high-frequency current to the coil; and
a terminal block configured to connect a wiring of the coil to a wiring of the inverter circuit,
wherein the communication device is disposed at a position not overlapping the terminal block with respect to a vertical direction.

16. A wireless power transfer apparatus for transferring power to a power receiving apparatus, the wireless power transfer apparatus comprising:
a support on which the power receiving apparatus is placed;
a coil disposed below the support and configured to generate a high-frequency magnetic field upon receiving supply of a high-frequency current;
a communication device disposed below the support to perform radio communication with the power receiving apparatus;
a first magnetic shield member made of an electric conductor, the first magnetic shield member being disposed between the communication device and the coil; and
a second magnetic shield member made of an electric conductor or a magnetic body, the second magnetic shield member being disposed on at least one of a lower surface and a lateral surface of the communication device,
a plurality of the communication devices; and
a controller configured to control operation of the wireless power transfer apparatus based on communication information of at least one communication device among the plurality of communication devices,
wherein the controller is configured to control operation of the wireless power transfer apparatus based on communication information of one or more communication devices from among the plurality of communication devices, the one or more communication devices other than a communication device having a minimum radio field strength of radio communication with the power receiving apparatus.

17. The wireless power transfer apparatus of claim 16, wherein the one or more communication devices include a communication device having a maximum radio field strength of radio communication with the power receiving apparatus.

18. A wireless power transfer system comprising
a wireless power transfer apparatus for transferring power to a power receiving apparatus, and a power receiving apparatus detachably supported on the wireless power transfer apparatus,
the wireless power transfer apparatus including:
a support on which the power receiving apparatus is placed;
a coil disposed below the support and configured to generate a high-frequency magnetic field upon receiving supply of a high-frequency current;
a communication device disposed below the support to perform radio communication with the power receiving apparatus; and
a first magnetic shield member made of an electric conductor, the first magnetic shield member being disposed between the communication device and the coil; and
a second magnetic shield member made of an electric conductor or a magnetic body, the second magnetic shield member being disposed on at least one of a lower surface and a lateral surface of the communication device, the power receiving apparatus including:
a power receiving coil configured to receive power from the coil when placed within the high-frequency magnetic field generated by the coil;
a second communication device configured to perform radio communication with the communication device of the wireless power transfer apparatus; and
a third magnetic shield member made of an electric conductor or a magnetic body, the third magnetic shield member being disposed on at least one of an upper surface and a lateral surface of the second communication device;
a first housing configured to accommodate the power receiving coil; and
a second housing disposed adjacent to the first housing and configured to accommodate the second communication device.

19. The wireless power transfer system of claim 18, comprising
an operating unit disposed on the second housing to perform an input operation for the power receiving apparatus.

20. The wireless power transfer system of claim 18, comprising
a display unit disposed on the second housing to display information related to operation of the power receiving apparatus.

* * * * *